US012579991B2

(12) United States Patent
Ekstrand et al.

(10) Patent No.: US 12,579,991 B2
(45) Date of Patent: Mar. 17, 2026

(54) GENERATIVE NEURAL NETWORK MODEL FOR PROCESSING AUDIO SAMPLES IN A FILTER-BANK DOMAIN

(71) Applicant: DOLBY INTERNATIONAL AB, Dublin (IE)

(72) Inventors: Per Ekstrand, Saltsjöbaden (SE); Janusz Klejsa, Solna (SE); Pedro Jafeth Villasana Tinajero, Sundbyberg (SE); Lars Villemoes, Järfälla (SE)

(73) Assignee: DOLBY INTERNATIONAL AB, Dublin (IE)

( * ) Notice: Subject to any disclaimer, the term of this patent is extended or adjusted under 35 U.S.C. 154(b) by 221 days.

(21) Appl. No.: 18/248,808

(22) PCT Filed: Oct. 15, 2021

(86) PCT No.: PCT/EP2021/078652
§ 371 (c)(1),
(2) Date: Apr. 12, 2023

(87) PCT Pub. No.: WO2022/079263
PCT Pub. Date: Apr. 21, 2022

(65) Prior Publication Data

US 2023/0395089 A1 Dec. 7, 2023

Related U.S. Application Data

(60) Provisional application No. 63/092,754, filed on Oct. 16, 2020.

(30) Foreign Application Priority Data

Nov. 12, 2020 (EP) .................................... 20207272

(51) Int. Cl.
*G10L 21/0208* (2013.01)
*G10L 25/30* (2013.01)

(52) U.S. Cl.
CPC .......... *G10L 21/0208* (2013.01); *G10L 25/30* (2013.01)

(58) Field of Classification Search
CPC .................................................. G10L 21/0208
(Continued)

(56) References Cited

U.S. PATENT DOCUMENTS 9,477,925 B2 10/2016 Seide
10,074,380 B2 9/2018 Wung
(Continued)

FOREIGN PATENT DOCUMENTS

CN 111081231 B 9/2023
EP 4229632 A1 8/2023
(Continued)

OTHER PUBLICATIONS

ARXIV IID: 1901.00072. Publication Date: Dec. 31, 2018 How we process NPL dates Authors: Robertson, Sean • Penn, Gerald • Wang, Yingxue (Year: 2018).*
ARXIV ID: 1901.00072 Publication Date: Dec. 31, 2018 How we process NPL dates Alithore: Ronhartenn Sean e Pann Cearald e\ Alfangq Vingyiie (Year2018) (Year: 2018).*
(Continued)

*Primary Examiner* — Bharatkumar S Shah

(57) ABSTRACT

A neural network system is provided, implementing a generative model for autoregressively generating a distribution for a plurality of current filter-bank samples of an audio signal, wherein the current samples correspond to a current time slot, and each current sample corresponds to a channel of the filter-bank. The system includes a hierarchy of a plurality of neural network processing tiers ordered from a top to a bottom tier, each tier trained to generate conditioning information based on previous filter-bank samples and, for at least each tier but the top tier, also on the conditioning information from a tier higher up in the hierarchy, and an output stage trained to generate the probability distribution based on previous samples for one or more previous time
(Continued)

slots and the conditioning information from the lowest processing tier.

17 Claims, 4 Drawing Sheets

(58) Field of Classification Search
USPC .......................................................... 704/226
See application file for complete search history.

(56) References Cited

U.S. PATENT DOCUMENTS

| | | | | |
|---|---|---|---|---|
| 10,262,260 | B2 | 4/2019 | Saon | |
| 10,304,477 | B2 * | 5/2019 | van den Oord | G06N 3/045 |
| 10,403,269 | B2 | 9/2019 | Sainath | |
| 10,460,747 | B2 | 10/2019 | Roblek | |
| 10,540,962 | B1 | 1/2020 | Chan | |
| 10,573,301 | B2 | 2/2020 | Adam | |
| 10,614,795 | B2 | 4/2020 | Li | |
| 2016/0284347 | A1 * | 9/2016 | Sainath | G06N 3/045 |
| 2017/0061978 | A1 * | 3/2017 | Wang | G10L 21/0232 |
| 2018/0040333 | A1 * | 2/2018 | Wung | G10L 21/0232 |
| 2018/0075343 | A1 | 3/2018 | Van Den Oord | |
| 2021/0390946 | A1 * | 12/2021 | Wang | G10L 21/0208 |
| 2023/0388503 | A1 * | 11/2023 | Besenbruch | G06T 3/4046 |
| 2023/0395089 | A1 * | 12/2023 | Ekstrand | G06N 3/0464 |

FOREIGN PATENT DOCUMENTS

| | | | | |
|---|---|---|---|---|
| WO | 2019199995 | A1 | 10/2019 | |
| WO | 2020010338 | A1 | 1/2020 | |
| WO | 2022078960 | A1 | 4/2022 | |
| WO | WO-2022079263 | A1 * | 4/2022 | G06N 3/045 |

OTHER PUBLICATIONS

ARXIV ID: 1901.00072 Publication Date: Dec. 31, 2018 How we process NPL dates Aiithore: Ronhartenn Sean e Pann Cearald e\Alfangq Vingyiie (Year2018) (Year: 2018) (Year: 2018).*

Huzaifah Met al: "Deep generative models for musical audio synthesis", Arxiv.org, Cornell University Library, 201 Olin Library Cornell University Ithaca, NY 14853, Jun. 10, 2020, pp. 1-27, 27 pages.

Klejsa Jet al: "High-quality speech coding with sample RNN", Database Inspec , The Institution of Electrical Engineers, Stevenage, GB; IEEE 2019, pp. 7155-7159, 5 pages.

Roy Fejgin et al: "Source coding of audio signals with a generative model", Arxiv.org, Cornell University Library, 201 Olin Library Cornell University Ithaca, NY 14853, Jan. 27, 2020, pp. 1-5, 5 pages.

Soroush Mehri et al: "SampleRNN: An unconditional End-to-End Neural Audio Generation Model", Feb. 11, 2017, published as a conference paper at ICLR 2017, pp. 1-11- 11 pages.

Akira Tamamori, et al., Speech waveform synthesis based on WaveNet considering speech generation process, IEICE Technical Report, vol. 116, No. 477, Feb. 22, 2017, pp. 1-6.

Takuma Okamoto, Kentaro Tachibana, Tomoki Toda, Yoshinori Shiga, Hisashi Kawai, Subband wavenet with overlapped single-sideband filterbanks, 2017 IEEE Automatic Speech Recognition and Understanding Workshop (ASRU), Jan. 25, 2018, https://ieeexplore.IEEE.org/document/8269005, Doi: 10.1109/ASRU.2017.8269005.

Tomoki Hayashi, Akira Tamamori, Kazuhiro Kobayashi, Kazuya Takeda1, Tomoki Toda, An investigation of multi- speaker training for wavenet vocoder, 2017 IEEE Automatic Speech Recognition and Understanding Workshop (ASRU), Jan. 25, 2018, https://ieeexplore.IEEE.org/document/8269007, Doi: 10.1109/ASRU.2017.8269007.

* cited by examiner

GENERATIVE NEURAL NETWORK MODEL FOR PROCESSING AUDIO SAMPLES IN A FILTER-BANK DOMAIN

CROSS-REFERENCE TO RELATED APPLICATION

This application is a U.S. National Stage of International Application No. PCT/EP2021/078652, filed Oct. 15, 2021, which claims priority of the following priority application: U.S. provisional application 63/092,754, filed 16 Oct. 2020 and European application 20207272.4, filed 12 Nov. 2020, each of which is hereby incorporated by reference in its entirety.

TECHNICAL FIELD

The present disclosure relates to the intersection between machine learning and audio signal processing. In particular, the present disclosure relates to a generative neural network model for processing samples in a filter-bank domain.

BACKGROUND

Generative neural network models may be trained to at least approximatively learn a true distribution of a training data set, such that the model may then generate new data by sampling from such a learned distribution. Generative neural network models have thus proven to be useful in various signal synthesis schemes, including both speech and audio synthesis, audio coding and audio enhancement. Such generative models are known to operate either in the time-domain or on magnitude spectra of a frequency representation of a signal (i.e. on spectrograms).

However, generative models that operate in the time-domain (such as e.g. WaveNet and sampleRNN) may not always facilitate integration with other signal processing tools with a frequency domain interface, such as e.g. tools used for equalization, and often use recursive networks that may have limited potential for parallelization. In addition, state-of-the-art generative models that operate on spectrograms (e.g. MelNet) do not reconstruct the phase of the audio signal during synthesis, but instead rely on a phase reconstruction algorithm (such as e.g. Griffin-Lim) as a post process in order to adequately reconstruct the audio.

In light of the above, there is a need for an improved generative model for audio signal processing.

SUMMARY

The present disclosure seeks to at least partly satisfy the above identified need.

According to a first aspect of the present disclosure, a neural network system (hereinafter "the system") for autoregressively generating a probability distribution for a plurality of current samples for/of a filter-bank representation of an audio signal is provided. The system may for example be a computer implemented system.

As far as the present disclosure is concerned, the current samples correspond to a current time slot, and each current sample corresponds to a respective channel of the filter-bank.

The system includes a hierarchy of a plurality of neural network processing tiers (hereinafter "tiers") ordered from a top tier to a bottom tier, wherein each tier has been trained to generate conditioning information based on previous samples for the filter-bank representation and, for at least each processing tier but the top tier, also on the conditioning information generated by a processing tier higher up in the hierarchy (such as, e.g., directly above in the hierarchy of tiers).

The system further includes an output stage that has been trained to generate the probability distribution based on previous samples corresponding to one or more previous time slots for the filter-bank representation and the conditioning information generated from the lowest processing tier.

According to a second aspect of the present disclosure, a method for autoregressively generating a probability distribution for a plurality of current samples for/of a filter-bank representation of an audio signal is provided. The current samples correspond to a current time slot, and each current sample corresponds to a respective channel of the filter-bank. Such a method may for example use the (computer implemented) system according to the first aspect in order to achieve such a goal.

According to a third aspect of the present disclosure, a non-transitory computer readable medium (hereinafter "the medium") is provided. The medium stores instructions which are operable, when executed by at least one computer processor belonging to a computer hardware, to implement the system of the first aspect, and/or to perform the method of the second aspect, using the computer hardware.

The present disclosure improves upon existing technology in multiple ways. By operating directly in the filter-bank domain, the generative model according to the present disclosure (as used e.g. in the system of the first aspect, in the method of the second aspect, and/or as implemented/performed using the media of the third aspect) may enable an easier integration with other signal processing tools having a frequency-domain interface, such as for example tools used for equalization. The model may learn how to cancel aliasing inherent in e.g. real-valued filter-banks. Due to the separation of the audio signal into dedicated frequency bands, the model may also learn to suppress for example quiet or empty frequency bands, and to handle general audio (such as for example music) more satisfactorily than models operating in the time-domain. From another point of view, the model operates on a filter-bank representation which is equivalent to handling both magnitude and phase of the audio signal inherently, and the synthesis process does not require e.g. various spectrogram inversion methods (such as e.g. the method of Griffin-Lim) to approximately recover phase information. As will also be described in more detail later herein, in some embodiments, the model may also offer increased parallel processing capabilities during audio generation, generating up to an entire filter-bank time slot in each step.

Other objects and advantages of the present disclosure will be apparent from the following description, the drawings, and the claims. Within the scope of the present disclosure, it is envisaged that all features and advantages of the generative model described with reference to e.g. the system of the first aspect are relevant for, and may be used in combination with, also the method of the second aspect and/or the medium of the third aspect, and vice versa.

BRIEF DESCRIPTION OF THE DRAWINGS

Exemplifying embodiments will be described below with reference to the accompanying drawings, in which.

Figure 1:
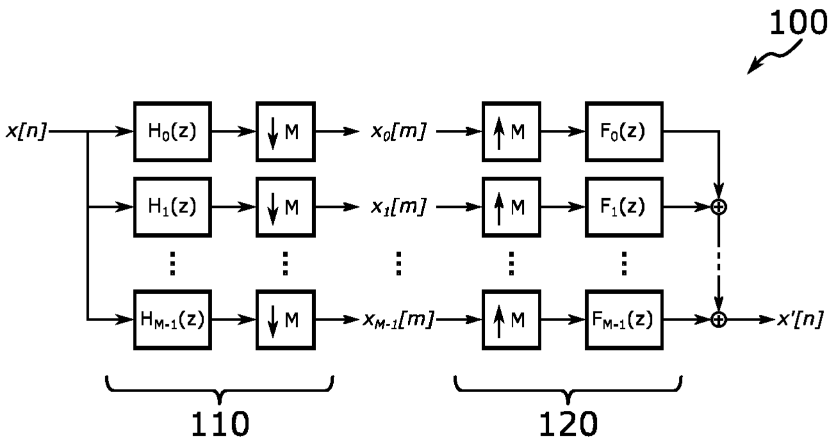
FIG. 1 schematically illustrates a generic filter-bank.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested.

DETAILED DESCRIPTION

A vector random variable of dimension K may be represented by the symbol X, and be assumed to have a probability density function $q_x$ (x). In the present disclosure, a realization of such a random variable is denoted by x, and may for example represent a vector of consecutive samples of an audio signal. It is envisaged that the dimension K can be arbitrary large, and that it does not need to be specified explicitly in what follows if not stated to the contrary.

The distribution $q_x(x)$ is in principle unknown, and it is assumed that it is only described by training data. A generative model (implemented by means of a system as described herein) represents a probability density function $p_x(x)$, and the generative model is trained to maximize a distribution match between $q_x(x)$ and $p_x(x)$. In order to do so, there are several distribution match measures that may be used. For example, it is envisaged that the model may be trained to minimize the Kullback-Leibler (KL) divergence between the (unknown) function $q_x(x)$ and the (trainable) function $p_x$ (x), according to e.g.

$$D_{KL}(q|p)=\int q_x(x)\log q_x(x)dx-\int q_x(x)\log p_x(x)dx. \tag{1}$$

As only the second term in the above equation (1) can be affected by the training of the model, it can be envisaged to minimize $D_{KL}$ by minimizing e.g. the negative log likelihood (NLL) defined as $$l_{NLL}(q|p)=-\int q_x(x)\log p_x(x)dx. \tag{2}$$

However, a practical problem may arise as $q_x(x)$ is unknown and an expectation of log $p_x(x)$ can usually not be computed analytically. In order to address such an issue, a data driven approximation may be used. For example, it may be assumed that a set of N realizations of the random variable X with the probability density $q_x(x)$ (i.e. a set of N vectors x) are available in the training data, and that such a set is denoted by Q. It is then envisaged to use the approximation $$-\int q_X(x)\log p_X(x)dx \approx -\frac{1}{N}\sum_{\overline{x}\in Q}\log p_X(\overline{x}), \tag{3}$$

which is assumed to be accurate if N is sufficiently large (thereby resembling a form of Monte Carlo sampling). In practice, the set Q constitutes a smaller fraction of the training data and may be referred to as a "minibatch".

A main feature of a trained generative model is that it allows to reconstruct a signal by e.g. random sampling from the trained (or learned) distribution function $p_x$. In practice, the function $p_x$ will be parametrized by the (trainable) neural network model (i.e., instead of trying to directly provide a large set of output values for the function $p_x$ for a large set of input values, the network will instead try to find a few parameters such as e.g. mean, standard deviation, and/or additional moments which may fully describe e.g. a Gaussian distribution or similar).

If dealing with e.g. a media signal in form of an audio signal, it may be expected that $p_x$ would need to be complicated in order to capture the statistical dependencies often found in such signals. Consequently, an associated neural network used to learn the function $p_x$ would need to be large. In order to reduce the required size of the neural network, a recursive form of the model may be used. As a first step towards such a recursive model, the samples of the signal are blocked into frames. Here, a notation will be used wherein $x_n$ denotes all samples of the vector x belonging to an n-th such frame. Typically, in previous state-of-the-art models, $x_n$ are scalar (including samples of audio signals). As a next step, the function $p_x$ is approximated in a recursive manner as $$p_X(x) = \prod_{n=0}^{T-1} p(x_n|x_{<n}), \tag{4}$$

where T is the total number of frames, and $x_{<n}$ is a short hand notation for all frames previous to the frame n, i.e. $x_0$, $x_1$, . . . , $x_{n-1}$.

The above formulation may allow for constructing a model of the conditional probability density p instead of the unconditioned probability density $p_x$. This may allow the use of a relatively lower number of model parameters (i.e. a smaller neural network) compared to the unconditioned model. In the course of training such a model, the conditioning may be done on the available previous samples. In the course of generation, the model may generate a single frame at a time, with conditioning on the previously generated samples.

The conditioning is typically extended with additional side information represented by Θ, which modifies equation (4) to read $$p_X(x) = \prod_{n=0}^{T-1} p(x_n|x_{<n}, \Theta). \tag{5}$$

Depending on the task in which the generative model is to be used, the additional side information Θ may represent auxiliary information related to the task. For example, in a coding task, Θ may e.g. include quantized parameters (sent in a bitstream) corresponding to the frame which is to be reconstructed in a current recursion step of the model (i.e. for a frame n, depending on one or more previous frames <n). In another example, in a signal enhancement task, Θ may e.g. include samples of the distorted signal, or e.g. features extracted from the samples of the distorted signal.

For the sake of simplicity, Θ will be dropped from the following discussion. However, it is to be understood that Θ (i.e. additional side information) may be added to the conditioning once the generative model is applied to a particular problem.

In order to make the model trainable, it is assumed that p is to have an analytic form. This may be achieved by selecting a prototype distribution for p. For example, simple parametric distributions may be used, including e.g. Logistic, Laplace, Gaussian, or similar, distributions. As an example, the case of a Gaussian distribution will be discussed below.

It may be assumed that $$p(x_n|x_{<n})=\mathcal{N}(\mu,\sigma), \tag{6}$$

where $\mathcal{N}$ denotes a normal (Gaussian) distribution for which the parameters including the mean μ and standard deviation σ are provided by the neural network with an update performed on a per frame basis. In order to achieve such a result, the neural network may be trained using e.g. back propagation and the NLL loss function.

In practice, however, an improved modelling capability may be obtained by using a mixture model. In such a situation, when the prototype distribution is Gaussian, it may be assumed instead that $$p(x_n|x_{<n}) = \sum_{j=1}^{J} w_j N_j(\mu_j, \sigma_j), \tag{7}$$

where J is the number of components in the mixture model, and where $w_j$ are mixture component weights (that are also provided by the neural network). By using several components, more complicated probability distributions than only a single Gaussian may thus be estimated by the neural network.

In e.g. a scalar case, it may be envisaged to use also other prototype distributions to create a mixture, e.g. Logistic, Laplace, or similar. In a vector case (M dimensions), the mixture components may be created by using M scalar distributions and an M×M linear transformation to introduce dependencies among the M dimensions.

As discussed earlier herein, previously known generative models for e.g. audio operates either in a time domain or (in a lossy manner due to an inherent need of approximate phase-reconstruction) on spectrograms, which may complicate integration with other signal processing components for audio offering only a frequency-domain interface. To overcome such an issue, the present disclosure therefore provides a generative model which operates on a filter-bank representation of a signal. As a consequence, $x_n$ will hereafter be multidimensional timeslots corresponding to samples of the signal in a filter-bank domain.

For purpose of description, a generic filter-bank will now be described with reference to FIG. 1.

FIG. 1 schematically illustrates an example of a generic filter-bank 100. In the filter-bank 100, samples x[n] of a signal (where n here denotes a particular time step) are passed through an analysis stage 110, wherein each sample is provided to a plurality of channels each including respective analysis filters $H_0(z)$, $H_1(z)$, . . . , $H_{M-1}(z)$, where M is a total number of such analysis filters and channels. Each analysis filter may for example correspond to a particular band of frequencies. In a minimal filter-bank including only two channels, $H_0(z)$ may for example correspond to a low-pass filter and $H_1(z)$ may for example correspond to a high-pass filter. If more than two channels are used, filters in between the first and last filter may for example be properly tuned band-pass filters. The output from each analysis filter may then be downsampled with a factor M, and the output from the analysis stage 110 is a plurality of filter-bank samples $x_0[m]$, $x_1[m]$, . . . , $x_{M-1}[m]$ all corresponding to a current filter-bank time slot m. Herein, the samples $x_0[m]$, $x_1[m]$, . . . , $x_{M-1}[m]$ are referred to as being in a "filter-bank domain" or constitute a "filter-bank representation" of the input signal x[n].

Various operations (such as additional filtering, extraction of co-dependent features between different channels, estimation of energy within each band/channel, etc.) may then be performed on the samples $x_j[m]$, before they are provided to a synthesis stage 120 of the filter-bank 100, in which the samples may e.g. first be upsampled with a factor M before being passed to a respective synthesis filter $F_0(z)$, $F_1(z)$, . . . , $F_{M-1}(z)$ in each channel of the filter-bank 100. The outputs from the synthesis stage 120 may then e.g. be added together to generate output samples x'[n] which may for example represent time-delayed versions of the input samples x[n]. Depending on the exact construction of the various analysis and synthesis filters, and on any eventual processing performed between the analysis and synthesis stages 110 and 120, the output signal x' [n] may or may not be a perfect reconstruction of the input signal x[n]. In many situations, such as for example in the encoding/decoding of e.g. audio signals, an analysis part of a filter-bank may be used on an encoder side to extract the various samples in the filter-bank domain, and various processing may be applied thereon in order to e.g. extract features which may be used to reduce a number of bits required to sufficiently reconstruct the signal in a synthesize stage located on a decoder side. For example, information extracted from the various samples in the filter-bank domain may be provided as additional side information, and the samples in the filter-bank domain themselves may be quantized and/or otherwise compressed before being transferred together with the additional side information to the decoder side. In another example, the filter-bank samples may themselves be omitted and only the additional side information be transferred to the decoder side. The decoder may then, based on the compressed/quantized samples of the filter-bank (if available) together with the provided additional side information reconstruct the signal x'[n] such that it satisfactorily resembles the original input signal x[n]. The filter-bank 100 may for example be a quadrature mirror filter (QMF) filter-bank, although it is envisaged also that other suitable types of filter-banks may be used. The filter-bank may for example be a critically sampled filter-bank, although other variants are also envisaged. The filter-bank may for example be of real-valued arithmetic, e.g. a cosine modulated filter-bank, although other variants are also envisaged, such as a complex-exponential modulated filter-bank.

How a model according to the present disclosure may be used in a signal processing scheme will now be described in more detail with reference to FIG. 2.

Figure 2:
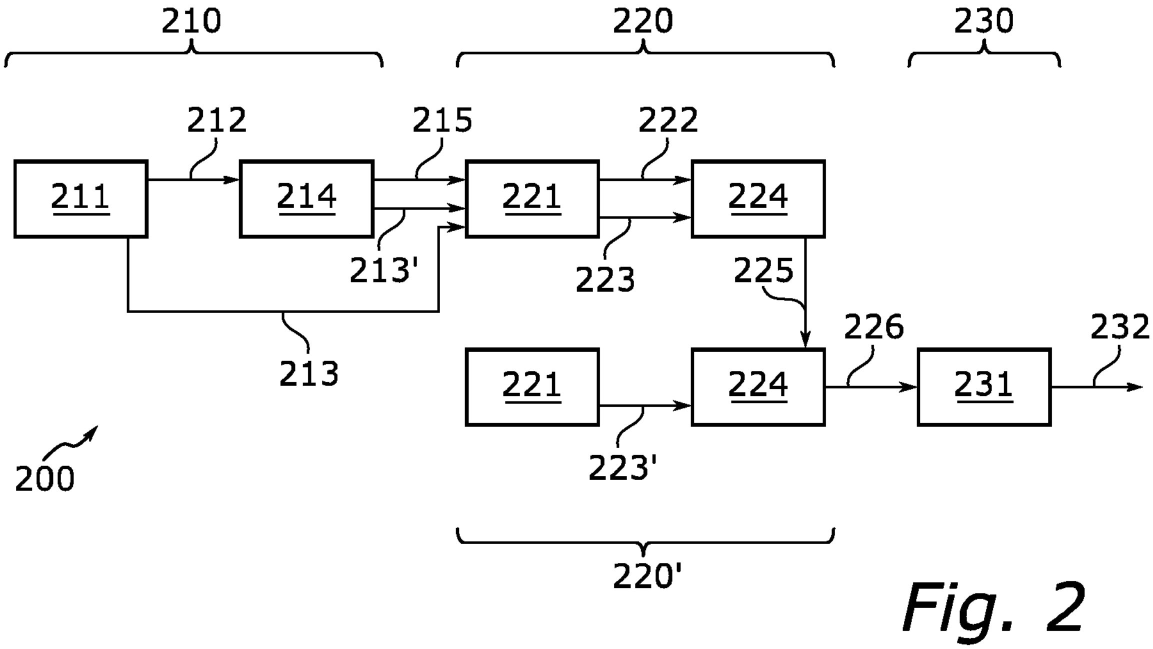
FIG. 2 schematically illustrates the use of a generative model according to one or more embodiments of the present disclosure in a signal processing scheme.

FIG. 2 schematically illustrates a processing scheme 200. In a pre-processing phase 210, a time-domain data set 211 is assumed to provide a (preferably large) number of time samples of e.g. audio. For example, the time domain data set 211 may include various recordings of various sounds sampled at e.g. a specific sampling rate, such that vectors 212 of time-domain samples of one or more audio signals may be extracted from the data set 211. These vectors 212 may be considered to include what is normally referred to as "ground truth" samples. Each such sample may for example represent an amplitude of an audio signal in a time-domain, at a particular sampling time. The time domain data set 211 may also include various features (or additional side information) 213 associated with the time-domain samples 212, including for example a quantized waveform in the time domain (e.g. decoded by a legacy codec), quantized spectral data transformed from the time domain (e.g. reconstructed by a decoder of a legacy codec), spectral envelope data, a parametric description of the signal, or other information which describes the frame. Such features 213 are not necessarily updated for each sample 212, but may instead be updated once per a frame containing multiple time-domain samples 212.

The time-domain samples 212 are then provided to at least an analysis stage 214 of a filter-bank, wherein (as described above with reference to FIG. 1) the signal represented by the time-domain samples are divided into multiple filter-bank bands/channels, and may e.g. be grouped together for a same time slot m, such that a plurality of filter-bank samples, each corresponding to a different filter-bank channel, constitutes a vector $x_m=[x_0[m], x_1[m], \ldots, x_{M-1}[m]]$, where M is a total number of filter-bank channels as described earlier herein. It is envisaged that additional side information 213' may also be extracted using the filter-bank and provided together with (or as a complement to) the additional side information 213.

Filter-bank samples 215 provided by the filter-bank analysis stage 214 and the additional side information 213 and/or 213' is then provided to a filter-bank data set 221. The filter-bank data set 221 defines both a training set of data (from which the model will learn) and an interference set of data (which the model may use to make predictions based on what it has learned from the training set of data). Usually, the data is divided such that the interference set does not include audio signals which are exactly the same as those in the training data set, thereby forcing the model to extract and learn more general features of audio, instead of only learning how to copy already experienced audio signals. The filter-bank samples 215 may be referred to as "filter-bank ground truth" samples.

During a training stage 220, filter-bank ground truth samples 222 belonging to the training data set are provided to a system 224 according to the present disclosure, which, for example, may include computer hardware to implement the generative model. Additional side information 223 may also be provided to the system 224. Based on the provided samples 222 (and possibly also on the provided additional side information 223), the system 224 is iteratively trained to predict the filter-bank samples of a current time slot m by using previously generated filter-bank samples for one or more previous time slots <m. During the training stage 220, such "previously generated filter-bank samples" may also be e.g. the previous ground truth samples. In a most general embodiment, the system learns how to estimate a probability distribution for filter-bank samples belonging to the current time slot, and the actual samples may then be obtained by sampling from such a distribution.

For each current (filter-bank) time slot m, the model of the system 224 successively learns how to estimate $p(x_m|x_{<m})$ and thus $p_x(x)$. As described earlier herein, this may be obtained by using backpropagation in order to try to minimize a loss function, such as e.g. the loss function $l_{NLL}$ as described above together with reference to one or more of the equations (2)-(7).

After being successfully trained, the model of the system 224 is defined by a plurality of optimized model parameters 225 (including e.g. the various weights and biases of the system). After the training stage 220 is ended, the processing scheme 200 may enter an inference stage 220'. In the inference stage, the trained model 224 may generalize and operate on unseen data. In the inference stage 220', the model of the system 224 may use the optimized model parameters 225 and does not require access to any filter-bank ground truth samples. In some situations, it is envisaged that the model of the system 224 is at least allowed access to additional side information 223', which may correspond to features of e.g. an audio signal that the system 224 is to reconstruct by iteratively predicting the probability distribution for the filter-bank samples for each time slot. As the model is able to generalize, and, once deployed, may operate in the inference stage 220', the additional side information 223' is not the same as the additional side information 223 provided to the model of the system 224 during the training stage 220. The model of the system 224 is supposed to generalize, and it is thus able to generate audio samples (unseen in the training) by using the additional side information 223'.

In a post-processing stage 230, filter-bank samples 226 reconstructed by sampling from the probability distributions generated by (a model of) the system 224 may, for example, be passed through at least a synthesis stage 231 of a filter-bank, such that an output signal 232 (e.g. in the time domain) may be generated.

In what follows, no separation of "system" and "model of the system" will be made, unless explicitly stated to the contrary. Phrased differently, it may be referred to as "the system being trained to . . . ", or "the system learning to . . . ", and any such reference should be interpreted that it is the model of the system, as implemented using e.g. computer hardware included in the system, that is trained/learned.

From FIG. 2, it may be seen that the system 224 according to the present disclosure may be used, once trained, in e.g. an encoding/decoding scheme. For example, as described earlier herein, the system 224 may form part of a decoder side and be given the task to predict current filter-bank samples based only on its own previously generated such samples and on additional side information provided from e.g. an encoder. It may thus be envisaged that a lower bitrate may be needed for streaming sufficient information over a channel between the encoder and the decoder, because the system 224 may learn how to, on its own, "fill in the blanks" in the information given to it in order to sufficiently reconstruct e.g. an audio signal on the decoder side. As described earlier herein, the system 224 may also, once trained, be used for other tasks such as e.g. signal enhancement, or others.

Two or more embodiments of a system (such as e.g. the system 224 described with reference to FIG. 2) according to the present disclosure will now be described with reference to FIGS. 3*a* and 3*b*.

Figure 3A:
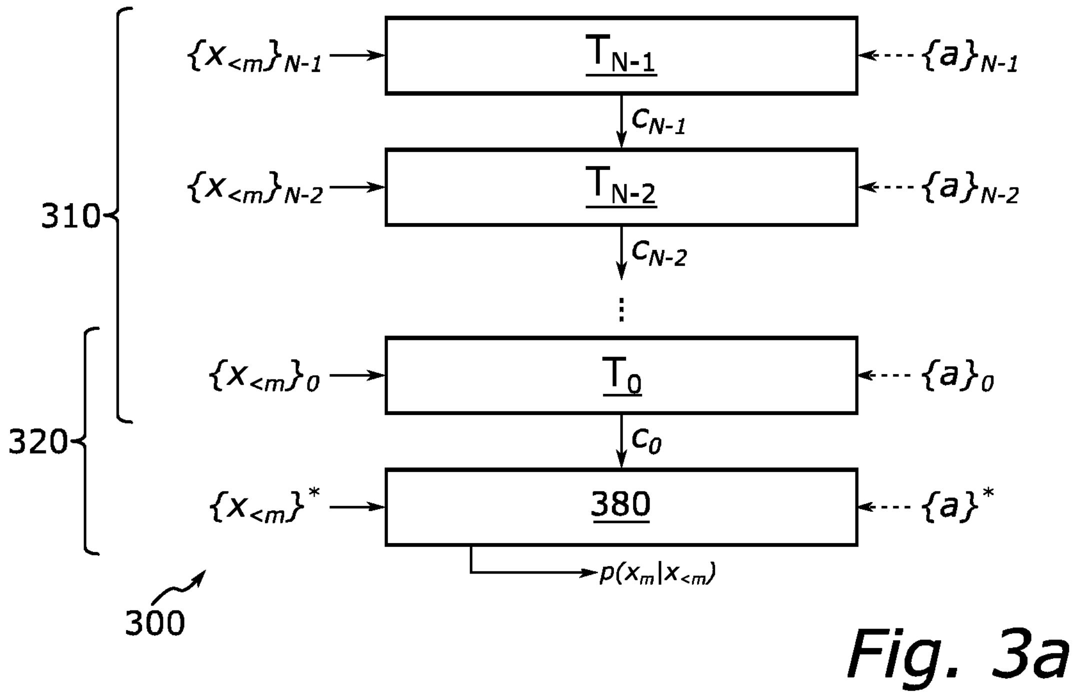
FIGS. 3*a* and 3*b* schematically illustrate two or more embodiments of a system implementing a generative model according to the present disclosure.

FIG. 3*a* schematically illustrates a system 300, which is envisaged as being implemented or implementable on one or more computers. The system 300 includes a hierarchy 310 of (neural network processing) tiers $T_{N-1}, T_{N-2}, \ldots, T_0$. In total, the hierarchy 300 includes a total number of N tiers. Although FIG. 3*a* indicates that there are at least three such tiers, it is envisaged also that there may be fewer tiers than three, such as for example only two tiers $T_1$ and $T_0$.

The tiers are hierarchically ordered from a top tier to a bottom tier. In the configuration shown in FIG. 3*a*, the top tier is tier $T_{N-1}$, while the bottom tier is tier $T_0$. As will be described later herein, each tier $T_j$ (where j is an integer between 0 and N−1) has been trained to generate conditioning information $c_j$ which is passed down to the next tier below in the hierarchy. For example, the conditioning information generated by the tier $T_{N-1}$ is passed on to the tier $T_{N-2}$ below, and so on. Preferably, each tier provides conditioning information only to the next tier lower in the hierarchy, but it may be envisaged also that one or more tiers provides conditioning information to tiers even further down in the hierarchy, if possible.

Each tier $T_j$ has been trained to generate its conditioning information $c_j$ based on previous filter-bank samples $\{x_{<m}\}_j$ generated by the system 300 during previous time slots <m. As indicated in the figure, the set of previous filter-bank samples provided to each tier are not necessarily equal. In some embodiments, each tier, or at least some tiers, may receive a different number of previous samples (e.g. for a different set of filter-bank channels) and/or for a different set of previous time slots. In some embodiments, each tier may receive the same set of previously generated filter-bank samples.

In some embodiments, each tier $T_j$ has been trained to generate its conditioning information c; also on additional side information $\{a\}_j$. As indicated in the figure, the content of such additional side information is not necessarily equal for all tiers. In some embodiments, the additional side information may be different for each tier, or at least for some tiers, while in other embodiments the additional side information provided to each tier may be equal. As illustrated by there being no m-index on the additional side information(s) in FIG. 1, it is envisaged that the additional side information may not necessarily change for each time slot. In some embodiments, the additional side information may be constant for two or more consecutive time slots, while in other embodiments the additional side information may change between each time slot. Herein, that the additional side information is "different" may include e.g. that the side information for each tier belongs to a same category of side information, but e.g. that that the side information is updated more often in one tier compared with another, or similar. Likewise, "different" may include e.g. that the side information provided to one tier does not belong to a same category as side information provided to another tier, etc. Here, a "category" may for example include data associated with a quantized waveform, spectral envelope (energy) data, quantized filter-bank coefficients, parametric signal description (e.g. vocoder parameters), and/or other such additional side information as described herein.

It should be noted that the generative model may still produce useful results even without conditioning on additional side information. Examples include situations wherein e.g. a sound has no "meaning" (i.e. it does not include speech, lyrics, known tunes, or similar), for example when generating various noises, wind sounds, background sounds, unknown musical pieces, and so on. For example, the generative model may be exposed to various recordings of wind noise during training, and then learn how to (during the inference phase) reproduce similar "wind-sounding" noises on its own, without the need for additional side information. By randomly sampling from the generated probability distributions, such noises may be constructed in a non-repetitively-sounding way.

Below the bottom tier $T_0$, the system 300 includes an additional neural network 380, which for example may be a multilayer perceptron (MLP) network or similar. In some embodiments, the MLP may be fully connected, or configured in a desired way in order to operate as intended. The neural network 380 receives the conditioning information $c_0$ from the bottom tier $T_0$. In some embodiments, the neural network 380 may also receive a set $\{x_{<m}\}^*$ of previously generated filter-bank samples (which may or may not be equal to one or more other such sets of samples provided to the tiers). The network 380 may also, in some embodiments, receive additional side information $\{a\}^*$, which may or may not be equal to one or more other such additional side information provided to the tiers. The neural network 380 forms part of an output stage 320 of the system 300, from which is generated an estimated probability distribution $p(x_m|x_{<m})$. As is illustrated in FIG. 3*a*, the output stage 320 may in some embodiments also include part or the whole of e.g. the bottom tier $T_0$, while in other embodiments the output stage does not include any tier. An example embodiment of the system 300 wherein the output stage include one or more tiers will be given further below.

As described herein, to generate/obtain the probability distribution, the output stage may (e.g. by using a multilayer perceptron network to estimate corresponding parameters) use a model including either a single prototype distribution, or a mixture model including a sum of several such prototype distributions (possibly of different types).

In some embodiments, the system 300 may further include means for generating the plurality of currents samples for the filter-bank representation (that is, the current filter-bank samples) by sampling from the generated probability distribution.

In some embodiments, each tier $T_j$ may include one or more convolutional networks or modules which are configured for receiving previously generated filter-bank samples. Each such convolutional network/module may learn to extract features of the filter-bank samples. In some embodiments, such convolutional networks are configured to use kernels whose size decreases with decreasing tier order in the hierarchy, i.e. from the top tier to the bottom tier. The kernel sizes may, for example, be decreased in the time dimension for the lower tiers, and thus allow for an increase in time resolution. In some embodiments, the kernel sizes are not changed in the frequency dimension, although such variants may also be envisaged. One envisaged such embodiment with decreasing kernel sizes for the lower tiers will be described later herein with reference to e.g. FIG. 4*a*.

In some embodiments, the various tiers $T_j$ are configured to operate in a recurrent manner, obtained by including in each tier one or more recurrent neural networks. For example, each tier may include at least on recurrent unit (or module) which may be configured for receiving as its input a sum of the outputs from the convolutional networks. At least each tier except the lowest/bottom tier may also include at least one (learned) upsampling module configured to take as its input the output from the at least one recurrent unit and to produce the conditioning information $c_j$ as its output. In some embodiments, the lowest tier may also include such at least one (learned) upsampling module. If e.g. the lowest tier does not include the upsampling module, the output $c_0$ from the lowest tier may, for example, be the output from the at least one recurrent unit in the lowest tier $T_0$.

In such recurrent networks, an internal (latent) state of the network is (to a higher or lesser degree) remembered such that a new such latent state may be computed based on one or more of the previous states. Such a use of "memory" may be beneficial when processing sequential data, such as e.g. filter-bank (audio) samples following upon each other in a sequence of time slots.

Figure 3B:
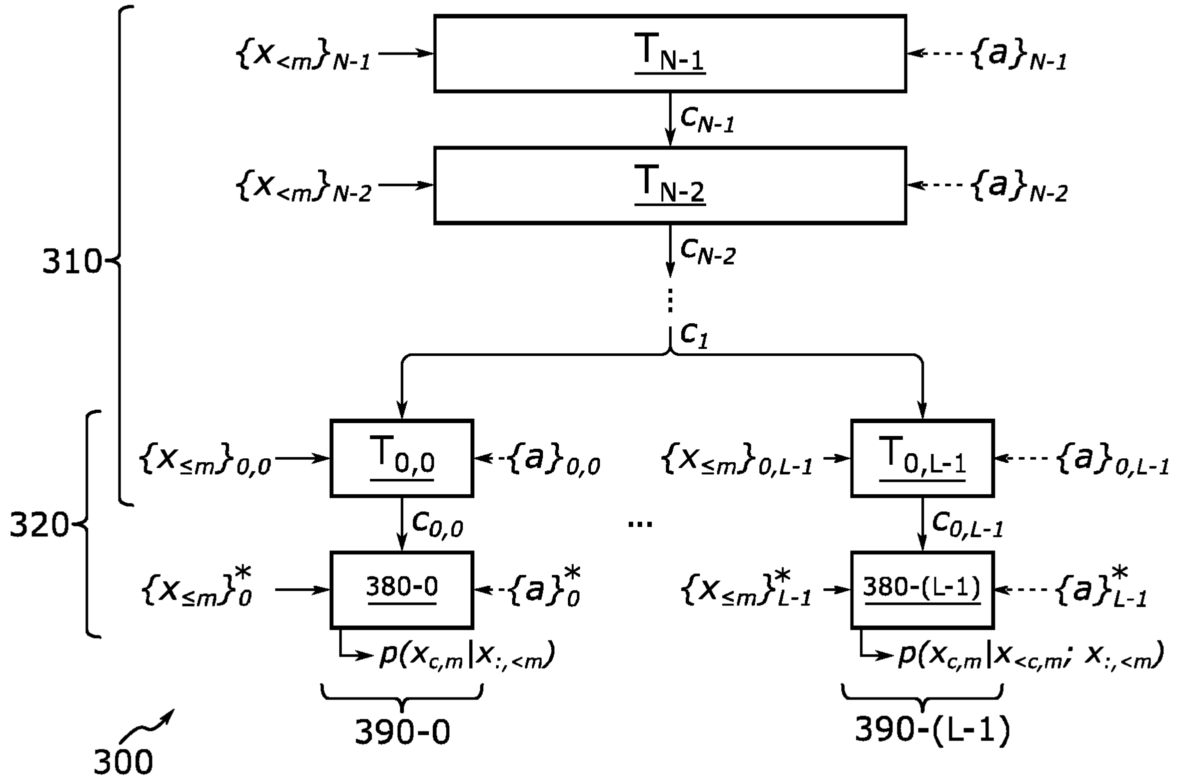

FIG. 3*b* illustrates schematically another embodiment of the system 300, wherein the output stage 320 includes the bottom tier, and wherein the output stage is divided into several sub-layers 390-0, . . . , 390-(L−1) (where L is a total number of sub-layers). In the output stage 320, each sub-layer 390-*j* includes a sub-tier $T_{0,j}$ of the tier $T_0$. The sub-layers may be sequentially executed, and each sub-layer may be trained to generate the probability distribution for one or more current samples corresponding to a true subset (i.e. at least one, but not all) of the channels of the filter-bank. For example, the true subset is different for each of the sub-layers. The true subsets may be overlapping (i.e. at least one subset includes a channel that is also included in another subset) or non-overlapping (each channel is included in only one of the subsets). For at least all but the first executed sub-layer, each sub-layer may be trained to generate the probability distribution also based on current samples generated by one or more previously executed sub-layers. Each sub-tier $T_{0,j}$ is provided with a set $\{x_{\leq m}\}_{0,j}$ of previously generated samples, which may (as will be described below) also include one or more currently generated filter-bank samples for channels handled by a preceding sub-layer 390-<j. The same applies to the neural networks 380-*j*, which may also be provided with such sets $\{x_{\leq m}\}^*_j$ of previously generated filter-bank samples, which may include filter-bank samples generated during the current step but for channels lower (in frequency) than the channels being processed by the sub-layer in question. Taking into account current samples for lower channels may e.g. be obtained using masked kernels in convolutional layers included in the various sub-tiers, as will be described later herein also with reference to FIG. 4*a*. It is also envisaged, as earlier described, that each sub-tier $T_{0,j}$ and each neural network 380-*j* also receives respective sets of additional side information $\{a\}_{0,j}$ and $\{a\}^*_j$, respectively, which may or may not be identical to corresponding additional side information provided to tiers higher up in the hierarchy 310.

In some embodiments, the first executed sub-layer 390-0 may generate one or more current samples corresponding to at least the lowest channel of the filter-bank, and the last executed sub-layer 390-(L−1) may generate on or more current samples corresponding to at least the highest channel of the filter-bank. In each sub-layer 390-*j*, the corresponding sub-tier $T_{0,j}$ provides conditioning information $c_{0,j}$ to a following neural network 380-*j*, for example an MLP.

More detailed examples of the use of such sub-division of the output stage 320 into multiple sub-layers/sub-tiers will now be given with reference to FIGS. 4*a* and 4*b*.

Figure 4A:
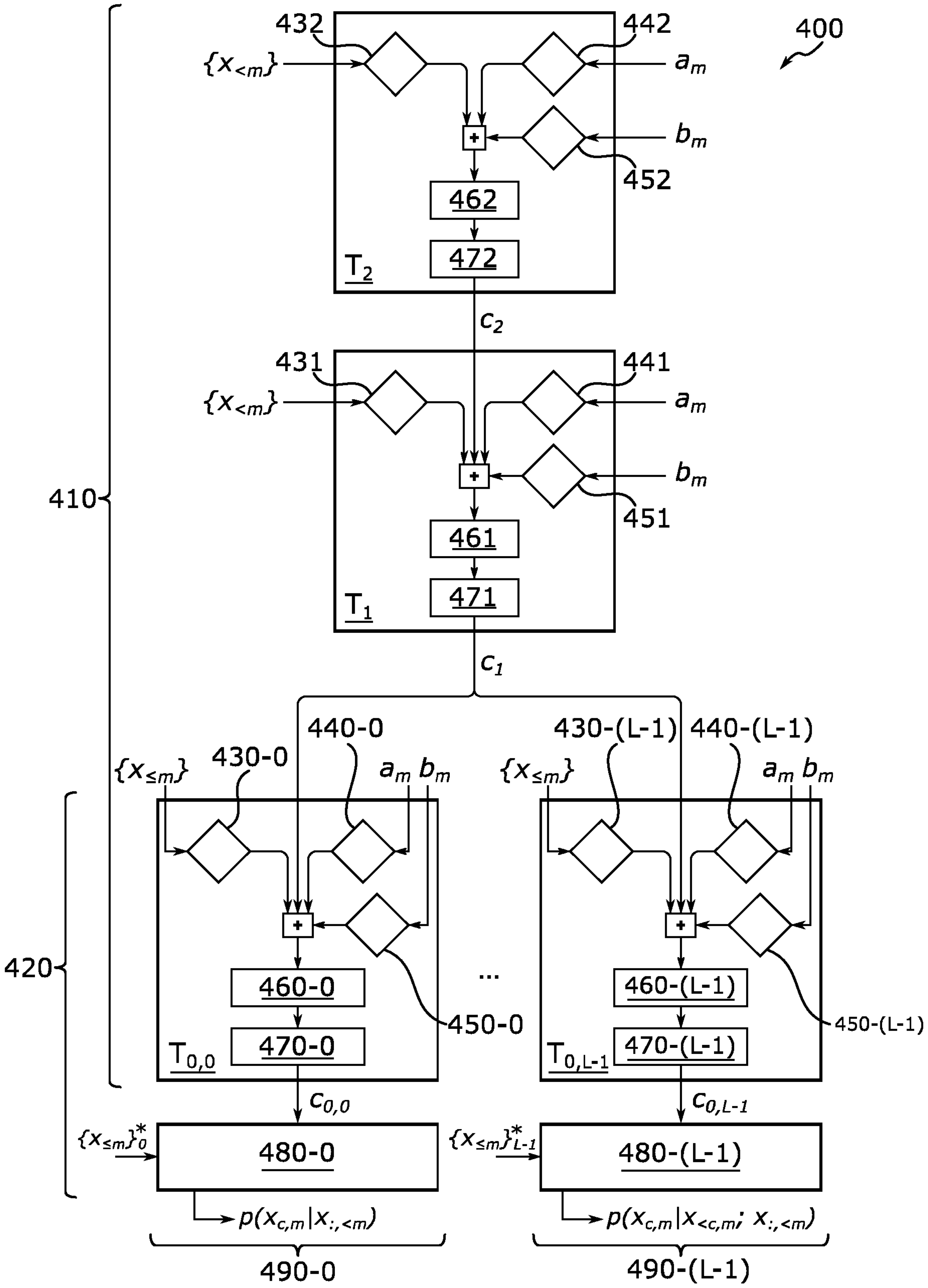
FIGS. 4*a* and 4*b* schematically illustrate two or more embodiments of a system implementing a generative model according to the present disclosure, and FIG. 5 schematically illustrates a flow of one or more embodiments of a method according to the present disclosure.

FIG. 4*a* schematically illustrates a system 400 which includes a hierarchy 410 of tiers. In the example system 400, the hierarchy 410 includes three tiers $T_2$, $T_1$ and $T_0$. In other examples, it is envisaged that the hierarchy may include fewer or more than three tiers.

In each tier, previously generated filter-bank samples $\{x_{<m}\}$ are received together with additional side information components $a_m$ and $b_m$. In the specific example given in FIG. 4*a*, the side information component $a_m$ includes envelope energy and the side information component $b_m$ includes a quantized representation of samples (e.g. obtained as reconstruction from a legacy codec). Here, the additional side information is updated for each time slot (thereby the index "m") and may e.g. be the same for all tiers. In some embodiments, it may be envisaged that the system 400 and other systems as described herein also uses "look-ahead" with regards to the additional side information (if provided), meaning that also additional side information for one or more "future" time slots >m are used and provided to the various tiers. In some embodiments, it may even be envisaged that additional side information only for one or more future frames is provided to the tiers.

For illustrative purpose, it may be assumed that the filter-bank samples correspond to 16 channels. For example, a 16 channel QMF filter-bank may have provided the filter-bank samples used for the filter-bank training data set used to train the system 400. Thus, it is assumed that each filter-bank sample vector $x_m$ includes 16 elements, each corresponding to one of the 16 QMF filter-bank channels.

In each tier, the set of received previous samples $\{x_{<m}\}$ may include a plurality of the most recently generated sample vectors. Such a plurality may for example include the latest Z generated sample vectors, i.e. such that $\{x_{<m}\}=\{x_{m-z}, x_{m-z+1}, \ldots, x_{m-1}\}$. In total, if each sample vector represents 16 filter-bank channels, the set of previous samples $\{x_{<m}\}$ includes 16*Z channel elements. It may be envisaged that in the present example, each tier receives a same set of previous samples. It may also be envisaged that each tier receives a different set of previous samples. For example, as time resolution increases as one traverses down in the hierarchy of tiers 410, some embodiments of the system 400 may include providing fewer previous samples for lower tiers. Here, "fewer previous" may include e.g. only the last Z' samples (where Z'<Z), while a higher tier (such as e.g. tier $T_2$) may receive all Z available previous samples. It is also to be noted that lower tiers may for example run/be executed more often than higher tiers.

The upper most (i.e. the top) tier $T_2$ includes a convolutional network 432 which takes as its input the set of previous samples $\{x_{<m}\}$. The convolutional network 432 may e.g. include 16 channels and use a kernel size of 15. The tier $T_2$ further includes another convolutional network 442, which takes as its input the envelope energy $a_m$. The convolutional network 442 may for example include 19 channels. The tier $T_2$ further includes a convolutional network 452 which takes as its input the quantized samples $b_m$. The convolutional network 452 may e.g. include 16 channels. The respective kernel sizes and strides of the convolutional networks 442 and 452 may be adapted to e.g. the time resolution(s) of the provided additional side information components $a_m$ and $b_m$. In general, the exact kernel sizes and strides of the various convolutional networks 432, 442 and 452 (and also those of corresponding convolutional networks in other, lower tiers) may be adjusted based on a plurality of factors, including e.g. the provided frame size of e.g. the previous samples $\{x_{<m}\}$, the time resolution(s) of the additional side information $a_m$ and $b_m$, and so on. If the number of output samples in the time (sequence) direction from the various convolutional networks within a same tier $T_j$ are different (given the choice of kernel sizes and strides of the networks 432, 442 and 452), it is envisaged that one or more upsampling units may also be provided such that the outputs from the various convolutional networks may be summed in a desirable way. For the particular combination of quantized samples and envelope conditioning, the quantized samples may be localized due to the separate initial processing of $a_m$ and $b_m$ in the tier $T_2$. Such a localization may for example improve further down in the hierarchy of tiers 410 when the quantized samples are provided to lower tiers, as the kernel sizes become shorter.

Here, it should be noted that e.g. the given kernel sizes are just for illustrative purpose and may be obtained e.g. by limited experimentation depending on e.g. the type of audio which is to be processed (e.g. speech, general audio, music, single instruments, etc.). The various convolutional networks may e.g. use a nominal stride equal to a frame size of each tier, i.e. depending on the exact number of previous sample vectors provided to each tier. A number of output channels of the various convolutional networks may for example correspond to the number of hidden dimensions used in the model, and also these numbers may be found e.g. based on the type of audio which is to be processed.

The output from all of the convolutional networks 432, 442 and 452 are then added together and provided as input to a recurrent neural network (RNN) 462. The RNN 462 may for example be implemented using one or more stateful network units, for example, gated recurrent units (GRUs), long short-term memory units (LSTMs), Quasi-Recurrent Neural Networks, Elman networks, or similar. A main property of such an RNN is that it remembers (to at least some extent) its hidden, latent state between each time slot.

In general, it is envisaged that at least some of the convolutional networks (e.g. 432) may use a maximum possible number of groups, in order to e.g. keep all of the filter-bank channels separated until a summation stage that is envisaged to be provided at the end of the convolutional network. Phrased differently, each channel may be convolved with its own set of filters. This may provide an improved ability for the system as disclosed herein to model/learn inter-channel dependencies. Although not illustrated explicitly in FIG. 4*a*, it is envisaged that e.g. the convolutional network 432 may include both a convolution component and a following summation component.

The output from the RNN 462 is provided as input to an upsampling stage 472, which may for example be implemented using a transpose convolutional network. It is envisaged that the network may itself learn exactly how to perform such an upsampling, i.e. the upsampling provided by the stage 472 may be a "learned upsampling".

The output from the upsampling stage 472 is provided to the next tier $T_1$ as conditioning information $c_2$. The tier $T_1$ is envisaged to include the same type of components as the top tier $T_2$, and it is envisaged that everything described above with reference to tier $T_2$ also apply to tier $T_1$ and the lowest tiers $T_{0,0}, \ldots, T_{0,L-1}$, if not state to the contrary in what follows.

One difference between the tiers is that at least some of the convolutional networks operates using kernel sizes which are smaller than those of the corresponding convolutional networks in the tier above. For example, the convolutional network 431 may still include 16 channels, but use a kernel size of e.g. 5. Likewise, the convolutional network 451 may still include 16 channels, but use a kernel size of e.g. 15. In some embodiments, it may be envisaged that the convolutional network 441 is different from its corresponding component in the top tier $T_2$, depending on e.g. exactly what additional side information that is provided.

After summation of the outputs of the convolutional networks 431, 441 and 451, and after further processing via the RNN 461 and the learned upsampling stage 471, tier $T_1$ outputs conditioning information $c_1$ which is passed down in the hierarchy towards the next tier(s).

In the system 400, the lowest tier is in turn divided into a plurality of sequentially executed sub-layers 490-*j* (where j=0, . . . , (L−1), and where L is the total number of such sub-layers). Each sub-layer 490-*j* includes a respective sub-tier $T_{0,j}$ and a sub-output stage 480-*j*. In FIG. 4*a*, it is assumed that the conditioning information $c_1$ is the same for all sub-layers 490-*j*. In other embodiments, it is envisaged that the conditioning information from the tier $T_1$ may be different for some or all of the sub-layers, and defined e.g. as $c_{1,j}$ for sub-layer 490-*j*. The same envisaged possibilities also apply to the system that will be described later herein with reference to FIG. 4*b*.

Here, "sequentially executed" means that processing first occurs in the sub-layer 490-0, followed by the next sub-layer and so on until and including processing in the last sub-layer 490-(L−1). In the sub-tiers $T_{0,j}$, it is envisaged that the tiers have access also to samples that have been calculated (or generated) so far for the time slot m, and that the kernels of the respective convolutional networks 430-*j* are "masked" accordingly in order to allow each sub-layer to compute a single or a few of the total number of channels, wherein the first sub-layer 490-0 is estimating one or more probability distributions for current samples associated with the lowest channel or subset of channels, and so on for each following sub-layer, until the last sub-layer 490-(L−1) which is responsible for estimating one or more probability distributions for current samples associated with the highest channel or subset of channels.

For example, the sub-layers 490-*j* may be configured such that a same number of channels are processed by each sub-layer. If there are e.g. 16 channels in total and e.g. L=4 sub-layers, the first sub-layer may be responsible for channels 0-3, the next sub-layer may be responsible for channels 4-7, etc., and the last sub-layer may be responsible for channels 12-15. Other divisions of the responsibility for the various channels among the sub-layers 490-*j* are of course also possible. By using masked kernels in the convolutional networks 430-*j*, it may be arranged such that even if placeholders for current samples for channels not yet calculated are provided (with placeholder values being close to the "true" values or at least not being zero), the convolution performed by e.g. the convolutional network 430-0 of the first sub-tier $T_{0,0}$ is such that it does not take the placeholder values into account. Thus, the calculation of e.g. the filter-bank samples for the first four channels 0-3 depends only on previously generated samples for one or more previous time slots. The corresponding convolutional network 430-1 (not illustrated in FIG. 4*a*) for the next sub-tier $T_{0,1}$ (also not illustrated in FIG. 4*a*) has a kernel which allows it to take into account the samples for the channels generated from the probability distribution generated by the first sub-layer 490-0, and so on, until the last sub-layer in which the convolutional network 430-(L−1) of the tier $T_{0,L-1}$ is allowed to take into account all the previously generated samples for all channels plus the current generated samples for all channels lower than those that are to be processed by the sub-layer 490-(L−1).

It should be noted that herein, when implying that a convolutional network has a "masked kernel", it is assumed that such a feature may be important only during training, where the whole system may have access to ground truth samples for the full range of channels, but where e.g. a sub-layer is not supposed to "see" such samples other than for a particular, true subset of the channels. However, during inference (i.e. after the generative model has already been trained), no such "samples belonging to bands other than those associated with a certain sub-layer" will (due to the sequential execution of the sub-layers) exist or at least be assumed to be zero. Thus, during inference, masked kernels may not be necessary.

As an example, using the above configuration of samples associated with a total of 16 channels, wherein there are four sub-layers and where each sub-layer processes 4 channels each, the following may occur for calculating the filter-bank samples for the current time slot m:

A set of previously generated samples $x_{<m}$ (including samples for all channels) is provided to the convolutional networks 430-*j*, together with place-holders for current samples $x_m$ that are to be calculated in the current step. The convolutional network 430-0 has a masked kernel which ignores all of the place-holders for current samples, but takes all of the provided previously generated samples for all channels into account. As a result, the sub-tier $T_{0,0}$ outputs conditioning data $c_{0,0}$ which is provided to the sub-output stage 480-0 (which may be a multilayer perceptron, as described earlier herein). The sub-output stage 480-0 generates a probability distribution $p(x_{c,m}|x_{:,<m})$, where "$x_{c,m}$" means a vector including samples for the time slot m and some set of channels "c", and where "$x_{:,<m}$" means a vector including samples for one or more previous time slots <m for all (":") channels. For the first sub-layer 490-0, c=0, 1, 2, 3. The probability distribution is conditioned on previously generated samples for previous time slots <m and for all 16 channels. After sampling from such a distribution, samples $x_{0,m}$, $x_{1,m}$, $x_{2,m}$ and $x_{3,m}$ for the first 4 channels for the current time slot m may be generated. The place-holders for these samples may then be replaced with the actual, generated values.

In the next sub-layer 490-1 (not shown), the kernel of the convolutional network 430-1 (not shown) is masked such that it allows access to all provided previous samples for previous time slots <m, but only for the 4 first channels of the current time slot m just recently generated from the first sub-layer 490-0. After generating conditioning information $c_{0,1}$ which is provided to the sub-output stage of this tier (not shown), a probability distribution $p(x_{c,m}|x_{<c,m}; x_{:,<m})$ is generated, where c=4, 5, 6, 7 and <c=0, 1, 2, 3. Phrased differently, this probability distribution is valid for current samples belonging to channels 4-7, but is conditioned on the previously generated samples during a previous time slot <m, but also on the samples generated for the channels just recently processed by the first sub-layer 490-0. Current samples for channels 4-7 are then obtained by sampling from this distribution, and inserted to replace their corresponding place-holders, and so on. In a same way, each sub-layer is sequentially executed until the last sub-layer has generated a probability distribution for the final 4 channels (i.e. such that c=12, 13, 14, 15), that is conditioned on previous samples generated for a previous time slot <m, but also on all previously generated samples for lower channels <c=0, . . . , 11 for the current time slot m. After having sequentially executed all sub-layers 490-*j*, probability distributions for all current samples for all channels have been obtained, and all such samples may or have been generated by sampling from the respective generated probability distributions.

In the various sub-layers 490-0 of the output stage 420, the components of the sub-tiers $T_{0,j}$ are basically the same as those for the tiers above. For example, the convolutional networks 430-*j* are similar to those of the tier $T_1$, except for the masked kernels of 430-*j*. Likewise, also the kernel sizes used in e.g. the convolutional networks 430-*j* and 450-*j* are smaller than those in the tier above (tier $T_1$). As earlier, the convolutional networks 440-*j* may be the same, or different, from those of the higher tiers. The same applies for the RNNs 460-*j* and the (learned) upsampling stages 470-*j* from which the conditioning information $c_{0,j}$ are output. In some embodiments, it may be assumed that e.g. a sub-tier $T_{0,j}$ and a corresponding sub-output stage 480-*j* operate with a same (e.g. highest possible) time resolution. In such situations, it is envisaged that e.g. the corresponding upsampling stage 470-*j* is not needed.

As illustrated in e.g. FIG. 4*a*, the various sub-output stages 480-*j* may also receive respective sets of previously generated samples $\{x_{<m}\}^*_j$. In other embodiments, it may be envisaged that such sets of previously generated samples are not needed for the various sub-output stages 480-*j*.

Figure 4B:
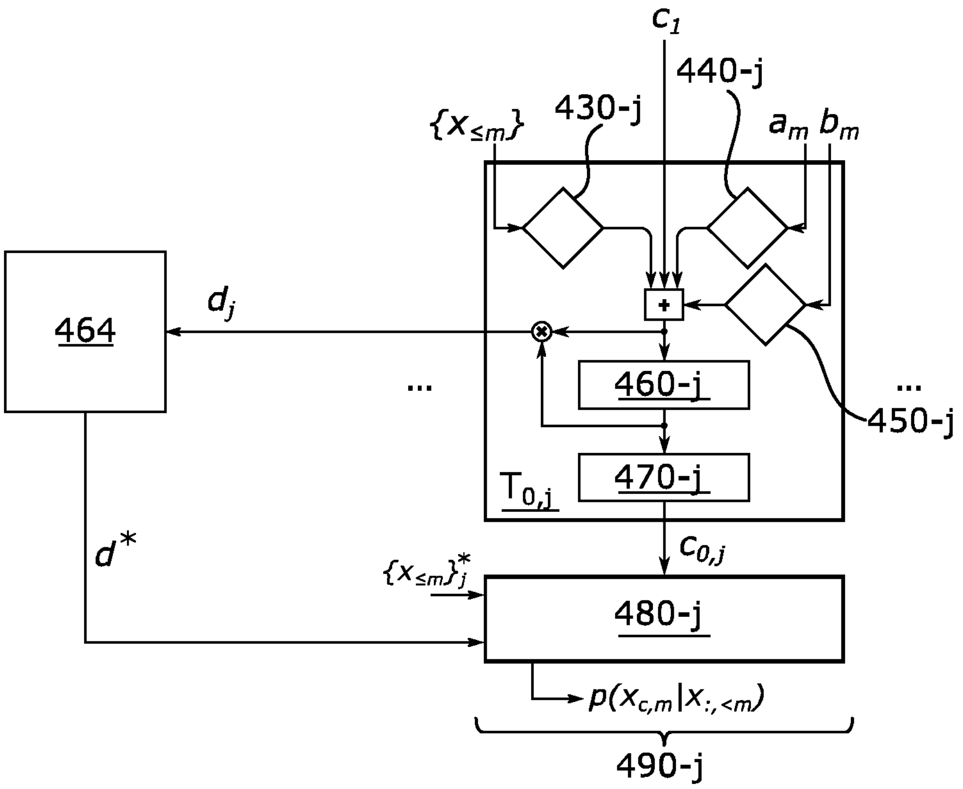

FIG. 4*b* illustrates another embodiment of a system according to the present disclosure, wherein an additional recurrent unit 464 is provided. The recurrent unit 464 may be e.g. a GRU or LSTM, or any other type already described herein, and is common for all sub-layers 490-*j*. The recurrent unit 464 may further help to predict samples for higher filter-bank channels from lower filter-bank channels. In contrast to the various recurrent units 460-*j* (who may be assumed to operate in a "time direction"), the recurrent unit 464 operates in a "layer direction". For each sub-layer 490-*j*, the sum of the outputs from the various convolutional layers 430-*j*, 440-*j*, 450-*j* and the conditioning information $c_1$ from the tier above are split into two parts. One part is mixed with the output of the recurrent unit 460-*j*, and provided as an input $d_j$ to the recurrent unit 464. The other part is, as explained earlier herein, provided as input directly to the recurrent unit 460-*j*. The recurrent unit 464 may be assumed to receive such input $d_j$ from each sub-layer 490-*j*, and will for each such input $d_j$ update its internal state. An output d*, i.e. the current state, from the recurrent unit 464 is then feed as an additional side information input to each sub-output stage 480-*j*. In some embodiments, the output d* from the recurrent unit 464 may be used to replace the conditioning information output $c_{0,j}$.

In commonly known state-of-the-art models, as described in the beginning above, one often operates with scalar sample vectors, wherein for each time slot only a single value is to be computed (e.g. a sample of a mono audio signal in a time-domain). This allows to use simple, scalar prototype distributions (such as e.g. Gaussian, Logistic, Laplace, etc.) in order to create a mixture model such as described above with reference to equation (7). However, the present disclosure suggests to operate a generative model in a filter-bank domain, wherein for each time slot m the vector is multidimensional, and wherein the dimensionality is governed by the number of filter-bank channels. For example, as described above, in the present disclosure the vector $x_m$ is such that each vector element does in turn include multiple components each corresponding to one of the filter-bank channels. Phrased differently, the present disclosure may rely on multidimensional time slots, wherein each time slot includes a plurality of frequency bands/slots.

The generative model of the present disclosure may therefore be configured to output multiple samples at a time (from the same timeslot). If, in for example the embodiments described with reference to FIGS. 3*b* and 4*a*/4*b*, there are an equal number of sub-layers as channels, it may be envisaged that each layer is concerned only with a single channel, and the reconstruction happens sequentially starting from 490-0 to 490-(L−1) However, it may often be the case that multiple bands need to be processed in a single step (such as when there are fewer sub-layers than channels, or when there is only a single tier/MLP in the output stage such as described with reference to FIG. 3*a*). To reconstruct inter-band/channel dependencies in such situation, the generative model may need to rely on a multivariate prototype distribution. This may allow for executing the reconstruction of these bands in a single step. This may offer some computational advantage, since MLP sub-layers of the model can then be executed in parallel (or alternatively that the parallel sub-layers can be combined in a single sub-layer, so that only a single sub-layer needs to be executed). For example, the model may be configured to reconstruct all the bands in a single step, which eliminates the need for sequential execution of the MLP sub-layers. The model can be also configured to output fewer bands than the full number of channels at the time, which would then require using more than one of the MLP sub-layers operating in a sequence.

Although other examples may also be considered, a multivariate Gaussian case may first be considered. It may be assumed that the generative model, for a single time slot m, outputs parameters corresponding to M-dimensional frames, where M is the number of filter-bank channels. In some situations, M may here include all available filter-bank channels. In some situations, however, the M used below may be considered to include not all, but at least two or more such channels. A Gaussian mixture model for this case may include J components, and be written as $$p(x_m|x_{<m}) = \sum_{j=0}^{J-1} w_j \mathcal{N}_j(\mu_j, \Sigma_j), \tag{8}$$

where, for the j-th component, $w_j$ is a scalar weight, $\mu_j$ is an M-dimensional mean, and $\Sigma_j$ is an M×M covariance matrix. It is to be noted that $\Sigma_j$ needs to be positive semidefinite. In order to impose such a constraint, instead of providing $\Sigma_j$ directly, the generative model implemented by the system of the present disclosure provides parameters of its Cholesky decomposition $U_j$, such as:

$$\Sigma_j = U_j U_j^T, \tag{9}$$

where $U_j$ is a lower triangular matrix with a non-zero main diagonal. This may be enough to guarantee that $\Sigma_j$ is invertible, which allows to optimize the scheme for e.g. an NLL loss function.

However, a possible drawback of such an approach may be that the number of model parameters grows like $\mathcal{O}(M^2)$, which may be undesired. In order to address such a potential issue, the present disclosure suggest to use that the common filter-banks (such as QMF, MDCT, DCT, etc.) includes a decorrelating property meaning that as M increases, the individual dimensions of a frame (time slot) become more and more decorrelated (due to e.g. energy concentration occurring in these filter-banks). This may allow to impose a structure on $\Sigma_j$, and also consequently on $U_j$.

For illustrative purpose, we will once again use a 16-dimensional case (corresponding e.g. to a filter-bank having 16 channels). For such a case, the present disclosure suggests to assume that at least some diagonals of $\Sigma_j$ are zero, i.e. such that $$\Sigma_j = \begin{pmatrix} \sigma_1^2 & c_{1,2}\sigma_1 & & & \\ c_{1,2}\sigma_1 & \sigma_2^2 + c_{1,2}^2 & c_{2,3}\sigma_2 & & \\ & c_{2,3}\sigma_2 & \sigma_3^2 + c_{2,3}^2 & & \\ & & & \ddots & c_{15,16}\sigma_{15} \\ & & & c_{15,16}\sigma_{15} & \sigma_{16}^2 + c_{15,16}^2 \end{pmatrix}, \tag{10}$$

and consequently $$U_j = \begin{pmatrix} \sigma_1 & & & & \\ c_{1,2} & \sigma_2 & & & \\ & c_{2,3} & \sigma_3 & & \\ & & & \ddots & \\ & & & c_{15,16} & \sigma_{16} \end{pmatrix}, \tag{11}$$

where $c_{1,2}, \ldots, c_{15,16}$ are scalar parameters provided by the network in order to parametrize $\Sigma_j$. In general, it may be preferred if $U_j$ has a small number of diagonals, which is larger than 1 but smaller than M.

The parameter $U_j$ can be further factorized into $$U_j = \tilde{U}_j \Lambda_j, \tag{12}$$

where $$\tilde{U}_j = \begin{pmatrix} 1 & & & & \\ d_{1,2} & 1 & & & \\ & d_{2,3} & 1 & & \\ & & & \ddots & \\ & & & d_{15,16} & 1 \end{pmatrix}, \tag{13}$$

and $$\Lambda_j = \begin{pmatrix} \sigma_1 & & & & \\ & \sigma_2 & & & \\ & & \sigma_3 & & \\ & & & \ddots & \\ & & & & \sigma_{16} \end{pmatrix}, \tag{14}$$

in order to improve numerical stability when inverting $\Sigma_j$. In this case $d_{1,2}, \ldots, d_{15,16}$ and $\sigma_1, \ldots, \sigma_{16}$ are the scalar parameters provided by the network in order to parametrize $\Sigma_j$.

In the scalar case, it may often be true that the use of e.g. Laplace or Logistic distributions provide better results than a Gaussian, due to properties of the associated training process. The present disclosure suggests a method of generalizing the above method to distributions other than Gaussian, and is valid also for multidimensional time slots.

In a first step, it is suggested to define M scalar distributions $F_b(\mu_b, s_b)$ for mixture component j, with scalar parameters $\mu_b$ and $s_b$ which are provided by the system. Next, it is suggested to define a linear transformation $L_j$ which takes a form of a triangular matrix with a unit main diagonal and a small number of non-zero diagonals. Generally, the matrix can be lower-triangular, or upper-triangular. For the clarity of the description, we will assume that it is lower triangular, but it can be understood that one could also consider the upper triangular case. Here, a "small number of non-zero diagonals" refers to the number of super-diagonals (for an upper-triangular matrix) or to the number of sub-diagonals (for a lower-triangular matrix). Furthermore, as an example, in a Gaussian case, $L_j$ would equal $\tilde{U}_j$. It is to be noted that $L_j$ is always invertible, and that the loss $l_{NLL}$ may be computed with $\forall_j L_j^{-1}\bar{x}$ instead of $\bar{x}$ with scalar prototype distributions in the formula for $l_{NLL}$ under the assumption that, after such a transformation, the individual dimensions are independent. Such an assumption is reasonable, as $L_j$ aims at introducing inter-band/channel correlation, while $L_j^{-1}$ removes such correlations, and as the training would aim at achieving a model which fits the specifications.

The above described transformation may for example be utilized in a system such as the system 300 described with reference to FIG. 3*a*, wherein the output stage 320 is not further divided into multiple sequentially executed sublayers, but instead generates a probability distribution for current samples for all channels in a single step, using a single bottom tier $T_0$ and a single output stage neural network 380 (such as e.g. a MLP). By (largely) eliminating the intra-frame/time-slot recursion present in the example described with reference to FIGS. 3*b* and 4*a*/4*b*, the system of FIG. 3*a* may offer an alternative which is more suitable for parallelization on suitable hardware. In the output stage 320 and the neural network 380, an update of the linear transformation $L_j$, and the parameters of $F_b$, may be provided for the respective mixture components, where, as described above, $L_j$ is a lower triangular matrix with ones on its main diagonal, and b non-zero diagonals, where 1<b<M. In some embodiments, in order to reconstruct e.g. a signal, or to generate filter-bank samples for a current time slot m, (random) sampling may be performed, where the sampling procedure includes a transformation with $L_1$.

The present disclosure also envisages a method for autoregressively generating a probability distribution for a plurality of current samples for a filter-bank representation of an audio signal, wherein the current samples correspond to a current time slot, and wherein each current sample corresponds to a respective channel of the filter-bank. Such a method is of course envisaged as using the generative model of the present disclosure, as implemented in any one of the systems described herein, in order to generate such a probability distribution. Such a method will now be briefly described with reference to FIG. 5.

Figure 5:
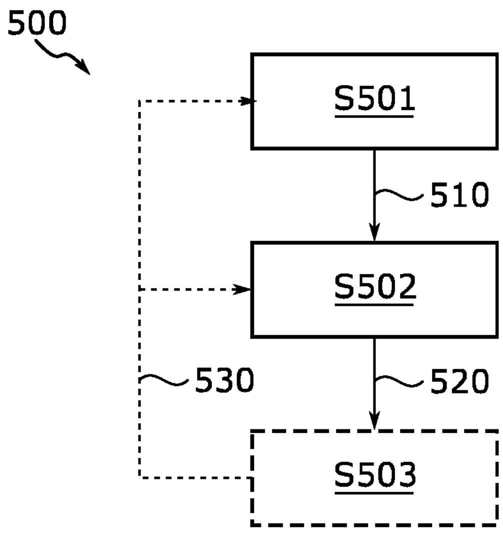

FIG. 5 schematically illustrates a flow of a method 500 according to one or more embodiments of the present disclosure. A step S501 includes using a hierarchy of a plurality of neural network processing tiers to generate a conditioning information 510 (e.g. $c_0$ as described earlier herein), wherein the tiers are ordered from a top processing tier to a bottom processing tier, wherein each processing tier has been trained to generate conditioning information based on previous samples for the filter-bank representation and, for at least each processing tier but the top tier, also on the conditioning information generated by a processing tier higher up in the hierarchy. In the step S501, "to generate a conditioning information" means to use the conditioning information generated by the bottom processing tier.

In a step S502, the conditioning information 510 provided/generated in step S501 is used together with an output stage that has been trained to generate a probability distribution 520, e.g. $p(x_m|x_{<m})$, based on previous samples corresponding to one or more previous time slots for the filter-bank representation and the conditioning information 510 generated in step S501.

In some embodiments of the method 500, a step S503 includes generating the plurality of current samples for the filter-bank representation by sampling from the generated probability distribution 520. The resulting samples 530 are then provided as previously generated samples for e.g. one or both of the steps S501 and S502.

In the method 500, the steps S501 and S502 may of course be combined into a single step (not illustrated), simply corresponding to using a system as disclosed herein in order to generate the probability distribution 520.

It is envisaged that the method 500 may be modified in accordance with what has been described and/or discussed for any embodiments of the system as disclosed herein. For example, the system (and thereby steps S501 and S502) may use additional side information, the tiers may be configured in the ways described earlier herein, the steps may include the use of recurrent units as described earlier herein, the output stage used in step S502 may be configured as described earlier herein, etc. Phrased differently, it is envisaged that the flow of the method 500 implement the generative model as described herein, e.g. by using any embodiment of a system as also described herein.

The present disclosure also envisages the provision of a non-transitory computer readable medium storing instructions operable, when executed by at least one computer processor belonging to a computer hardware, to implement the generative model (i.e. by implementing the system as described herein, and/or by performing the above method) using the computer hardware.

It is envisaged that the generative model, as implemented in a system as described herein or perform by a method as also described herein, may for example be used in a coding scheme, preferably in a decoder. Instead of sending a complete audio signal to the decoder side, the generative model may learn how to generate current samples based on previously generated samples (i.e., to "fill in the blanks" on its own), and with the provision of additional side information (which may be e.q. quantized filter-bank samples, or other coding data, etc.) the generative model may learn how to generate the filter-bank samples such that a signal sufficiently reminiscing the original signal may be reconstructed in a later synthesis stage. As also mentioned earlier herein, other tasks may also be suitable for the generative model, such as for example signal enhancement. The generative model may for example receive a noisy signal as additional side information, and learn how to remove such noise by adapting the generated probability distribution from which samples are to be generated accordingly.

The neural network system of the present disclosure, as described in the above example embodiments, may for example be implemented using a computer, using computer hardware, including e.g. a (computer) processor (e.g., a central processing unit (CPU), a graphics processing unit (GPU), a digital signal processor (DSP), one or more application specific integrated circuits (ASICs), one or more radio-frequency integrated circuits (RFICs), or any combination of these) and a memory coupled to the processor. As described above, the processor may be adapted to carry out some or all of the steps of the methods also described throughout the present disclosure.

The computer hardware may for example be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that computer hardware. Further, the present disclosure shall relate to any collection of computer hardware that individually or jointly execute instructions to perform any one or more of the concepts discussed herein.

As used herein, the term "computer-readable medium" includes, but is not to be limited to, data repositories in the form of solid-state memories, optical media, and magnetic media, for example.

Unless specifically stated otherwise, as apparent from the following discussions, it is appreciated that throughout the disclosure discussions utilizing terms such as "processing", "computing", "calculating", "determining", "analyzing" or the like, refer to the action and/or processes of a computer hardware or computing system, or similar electronic computing devices, that manipulate and/or transform data represented as physical, such as electronic, quantities into other data similarly represented as physical quantities.

In a similar manner, the term "computer processor" may refer to any device or portion of a device that processes electronic data, e.g., from registers and/or memory to transform that electronic data into other electronic data that, e.g., may be stored in registers and/or memory. A "computer" or a "computing machine" or a "computing platform" or a "computer hardware" may include one or more processors.

The concepts described herein are, in one or more example embodiments, are performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system (i.e. a computer hardware) that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system/hardware executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to e.g. "one example embodiment", "some example embodiments" or "an example embodiment" means that a particular feature, structure or characteristic described in connection with the example embodiment is included in at least one example embodiment of the present disclosure. Thus, appearances of the phrases such as e.g. "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the present disclosure, various features of the disclosure are sometimes grouped together in a single example embodiment, Figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects of the present invention may be appreciated from the following enumerated example embodiments (EEEs):

EEE 1. A neural network system (300) for autoregressively generating a probability distribution for a plurality of current samples ($x_m$) for a filter-bank representation of an audio signal, wherein the current samples correspond to a current time slot (m), and wherein each current sample corresponds to a respective channel of the filter-bank, including:
- a hierarchy (310) of a plurality of neural network processing tiers ($T_{N-1}, T_{N-2}, \ldots, T_0$) ordered from a top processing tier ($T_{N-1}$) to a bottom processing tier ($T_0$), wherein each processing tier ($T_j$) has been trained to generate conditioning information ($c_j$) based on previous samples ($x_{<m}$) for the filter-bank representation and, for at least each processing tier but the top tier, also on the conditioning information ($c_{j+1}$) generated by a processing tier ($T_{j+1}$) higher up in the hierarchy, and
- an output stage (320) that has been trained to generate the probability distribution based on previous samples ($x_{<m}$) corresponding to one or more previous time slots (<m) for the filter-bank representation and the conditioning information generated from the lowest processing tier.

EEE 2. The system of EEE 1, where each processing tier has been trained to generate the conditioning information also based on additional side information (a) provided for the current time slot.

EEE 3. The system of EEE 1 or 2, further including means configured for generating the plurality of current samples for the filter-bank representation by sampling from the generated probability distribution.

EEE 4. The system of any one of EEEs 1 to 3, wherein each processing tier includes convolutional modules configured for receiving the previously samples for the filter-bank representation, wherein each convolutional module has a same number of input channels as a number of channels of the filter-bank, and wherein kernel sizes of the convolutional modules decrease from the top processing tier to the bottom processing tier in the hierarchy.

EEE 5. The system of EEE 4, wherein each processing tier includes at least one recurrent unit configured for receiving as its input a sum of the outputs from the convolutional modules, and, for at least each processing tier but the lowest processing tier, at least one learned upsampling module configured to receive as its input an output from the at least one recurrent unit and to generate as its output the conditioning information.

EEE 6. The system of any one of the preceding EEEs, wherein the output stage includes the bottom processing tier, and wherein the bottom processing tier is subdivided into a plurality of sequentially executed sub-layers, wherein each sub-layer has been trained to generate the probability distribution for one or more current samples corresponding to a true subset of the channels of the filter-bank and, at least for all but the first executed sub-layer, each sub-layer has been trained to generate the probability distribution also based on current samples generated by one or more previously executed sub-layers.

EEE 7. The system of EEE 6, wherein the first executed sub-layer generates one or more current samples corresponding to at least the lowest channel of the filter-bank, and wherein the last executed sub-layer generates one or more current samples corresponding to at least the highest channel of the filter-bank.

EEE 8. The system of any one of the preceding EEEs, wherein the probability distribution for the current samples is obtained using a mixture model.

EEE 9. The system of EEE 8, wherein generating the probability distribution includes providing an update of a linear transformation ($L_j$) for a mixture coefficient (j) of the mixture model, wherein the linear transformation is defined by a triangular matrix with ones on its main diagonal, and wherein the triangular matrix has a number of non-zero diagonals greater than one and smaller than the number of channels of the filter-bank.

EEE 10. The system of EEE 9 when depending on EEE 3, wherein the sampling includes a transformation with the linear transformation.

EEE 11. The system of EEE 6 when depending on EEE 5, further including an additional recurrent unit (464) common to all sub-layers of the bottom processing tier and configured for receiving as its input a mix of i) the sum of the outputs from the convolutional modules and ii) the output of the at least one recurrent unit (460-*j*), and to based thereon generate additional side information (d*) to a respective sub-output stage (480-*j*) of each sub-layer (490-*j*).

EEE 12. A method for autoregressively generating a probability distribution for a plurality of current samples for a filter-bank representation of an audio signal, wherein the current samples correspond to a current time slot, and wherein each current sample corresponds to a respective channel of the filter-bank, including generating said probability function by using the system of any one of the preceding EEEs.

EEE 13. A non-transitory computer readable medium storing instructions operable, when executed by at least one computer processor belonging to a computer hardware, to implement the system according to any one of EEEs 1 to 11, and/or to perform the method of EEE 12, using said computer hardware.

The invention claimed is:

1. A computer implemented neural network system for autoregressively generating a plurality of current filter-bank samples of a filter-bank representation of an audio signal, wherein the current filter-bank samples correspond to a current time slot, and wherein each current filter-bank sample corresponds to a respective channel of the filter-bank, including:

a hierarchy of a plurality of neural network processing tiers ordered from a top processing tier to a bottom processing tier, wherein each processing tier has been trained to generate conditioning information based on previous filter-bank samples of the filter-bank representation and, for at least each processing tier but the top tier, also on the conditioning information generated by a processing tier higher up in the hierarchy, and an output stage that has been trained to generate a probability distribution for said plurality of current filter-bank samples based on previous filter-bank samples corresponding to one or more previous time slots of the filter-bank representation and the conditioning information generated from the lowest processing tier, said output stage being configured to sample the probability distribution to obtain said plurality of current filter bank samples, wherein the output stage includes the bottom processing tier, and wherein the bottom processing tier is subdivided into a plurality of sequentially executed sub-layers, wherein each sub-layer has been trained to generate the probability distribution for one or more current filter-bank samples corresponding to a true subset of the channels of the filter-bank and, at least for all but a first executed sub-layer, each sub-layer has been trained to generate the probability distribution also based on current filter-bank samples generated by one or more previously executed sub-layers.

2. The system of claim 1, where each processing tier has been trained to generate the conditioning information also based on additional side information provided for the current time slot.

3. The system of claim 1, further including means configured for generating the plurality of current filter-bank samples of the filter-bank representation by sampling from the probability distribution.

4. They system of claim 3, wherein the probability distribution for the current filter-bank samples is obtained using a mixture model.

5. The system of claim 4, wherein generating the probability distribution includes providing an update of a linear transformation for a mixture coefficient of the mixture model, wherein the linear transformation is defined by a triangular matrix with ones on its main diagonal, and wherein the triangular matrix has a number of non-zero diagonals greater than one and smaller than the number of channels of the filter-bank.

6. The system of claim 1, wherein each processing tier includes convolutional modules configured for receiving the previous filter-bank samples of the filter-bank representation, wherein each convolutional module has a same number of input channels as a number of channels of the filter-bank, and wherein kernel sizes of the convolutional modules decrease from the top processing tier to the bottom processing tier in the hierarchy.

7. The system of claim 6, wherein each processing tier includes at least one recurrent unit configured for receiving as its input a sum of the outputs from the convolutional modules, and, for at least each processing tier but the lowest processing tier, at least one learned upsampling module configured to receive as its input an output from the at least one recurrent unit and to generate as its output the conditioning information.

8. The system of claim 7, further including an additional recurrent unit common to all sub-layers of the bottom processing tier and configured for receiving as its input a mix of i) the sum of the outputs from the convolutional modules and ii) the output of the at least one recurrent unit, and to based thereon generate additional side information to a respective sub-output stage of each sub-layer.

9. The system of claim 1, wherein the first executed sub-layer generates one or more current filter-bank samples corresponding to at least the lowest channel of the filter-bank, and wherein the last executed sub-layer generates one or more current filter-bank samples corresponding to at least the highest channel of the filter-bank.

10. The system of claim 1, wherein the probability distribution for the current filter-bank samples is obtained using a mixture model.

11. The system of claim 10, wherein generating the probability distribution includes providing an update of a linear transformation for a mixture coefficient of the mixture model, wherein the linear transformation is defined by a triangular matrix with ones on its main diagonal, and wherein the triangular matrix has a number of non-zero diagonals greater than one and smaller than the number of channels of the filter-bank.

12. The system of claim 5, wherein the sampling includes a transformation with the linear transformation.

13. A non-transitory computer readable medium storing instructions operable, when executed by at least one computer processor belonging to a computer hardware, to implement the system according to claim 1 using said computer hardware.

14. A computer implemented neural network system for autoregressively generating a plurality of current filter-bank samples of a filter-bank representation of an audio signal, wherein the current filter-bank samples correspond to a current time slot, and wherein each current filter-bank sample corresponds to a respective channel of the filter-bank, including:

a hierarchy of a plurality of neural network processing tiers ordered from a top processing tier to a bottom processing tier, wherein each processing tier has been trained to generate conditioning information based on previous filter-bank samples of the filter-bank representation and, for at least each processing tier but the top tier, also on the conditioning information generated by a processing tier higher up in the hierarchy, and an output stage that has been trained to generate a probability distribution for said plurality of current filter-bank samples based on previous filter-bank samples corresponding to one or more previous time slots for the filter-bank representation and the conditioning information generated from the lowest processing tier, said output stage being configured to sample said probability distribution to obtain said plurality of current filter bank samples, wherein each processing tier includes convolutional modules configured for receiving the previous filter-bank samples of the filter-bank representation, wherein each convolutional module has a same number of input channels as a number of channels of the filter-bank, and wherein kernel sizes of the convolutional modules decrease from the top processing tier to the bottom processing tier in the hierarchy.

15. A method for autoregressively generating a plurality of current filter-bank samples of a filter-bank representation of an audio signal, wherein the current filter-bank samples correspond to a current time slot, and wherein each current filter-bank sample corresponds to a respective channel of the filter-bank, including generating and sampling a probability distribution by using the system of any one of the preceding claims.

16. The method of claim 15, comprising the steps of:

using the plurality of neural network processing tiers to generate conditioning information, wherein the conditioning information is generated using the bottom processing tier; and using an output stage generate the probability distribution, based on previous filter-bank samples corresponding to one or more previous time slots for the filter-bank representation and the conditioning information generated using the bottom processing tier.

17. A non-transitory computer readable medium storing instructions operable, when executed by at least one computer processor belonging to a computer hardware, to perform the method of claim 15 using said computer hardware.

* * * * *